United States Patent [19]

Gebben et al.

[11] Patent Number: 5,573,744

[45] Date of Patent: *Nov. 12, 1996

[54] METHOD FOR ENHANCING PRODUCTION OF TITANIUM DIOXIDE

[75] Inventors: Vernon D. Gebben, Oklahoma City, Okla.; Walter D. Bruce, Columbus, Miss.

[73] Assignee: Kerr-McGee Corporation, Oklahoma City, Okla.

[*] Notice: The term of this patent shall not extend beyond the expiration date of Pat. No. 5,556,600.

[21] Appl. No.: 390,190

[22] Filed: Feb. 17, 1995

Related U.S. Application Data

[63] Continuation of Ser. No. 156,005, Nov. 23, 1993, abandoned.

[51] Int. Cl.⁶ .................................................. C01G 23/047
[52] U.S. Cl. ................................................................ 423/613
[58] Field of Search ................................ 423/613, DIG. 5, 423/659, 614; 106/437; 422/112, 111; 73/703, 590, 24.01, 24.05

[56] References Cited

U.S. PATENT DOCUMENTS

| | | | |
|---|---|---|---|
| 3,219,411 | 11/1965 | Cheever et al. | 423/613 |
| 3,467,502 | 9/1969 | Davis | 422/112 |
| 3,573,000 | 3/1971 | Toomey et al. | 422/111 |
| 3,663,283 | 5/1972 | Hebert et al. | 106/437 |
| 3,854,882 | 12/1974 | Washburn | 422/112 |
| 3,926,563 | 12/1975 | Kotulak et al. | 422/112 |
| 4,300,909 | 11/1981 | Krumhansl | 422/112 |
| 4,455,288 | 6/1984 | Salter et al. | 423/613 |
| 4,459,850 | 7/1984 | Hyanova et al. | 73/703 |
| 4,529,573 | 7/1985 | Varady | 422/112 |
| 4,535,632 | 8/1985 | Sinha et al. | 73/703 |
| 4,854,713 | 8/1989 | Soechtig | 422/111 |

*Primary Examiner*—Steven Bos
*Attorney, Agent, or Firm*—Herbert M. Hanegan; J. Rodgers Lunsford

[57] ABSTRACT

A method and apparatus for producing $TiO_2$ by reacting $O_2$ and $TiCl_4$ in a reactor tube wherein pressure fluctuations in the flow of fluids through the reactor tube are sensed and output signals are generated proportional to the sensed pressure fluctuations. The flow of at least one of the $TiCl_4$ or $O_2$ is then varied through the reactor tube in response to predetermined pressure fluctuations so as to increase the efficiency of the reaction between $TiCl_4$ and the $O_2$. The efficiency of the reaction between $O_2$ and $TiCl_4$ in the reactor tube is achieved by a control apparatus operably connected to the reactor assembly which is capable of monitoring pressure fluctuations in $TCl_4$ and $O_2$ through the reactor assembly so that the flow of at least one of the $TiCl_4$ or $O_2$ can be varied in response to predetermined pressure fluctuations. The control apparatus includes a sensor assembly, a signal conditioning unit and a signal processing unit.

22 Claims, 1 Drawing Sheet

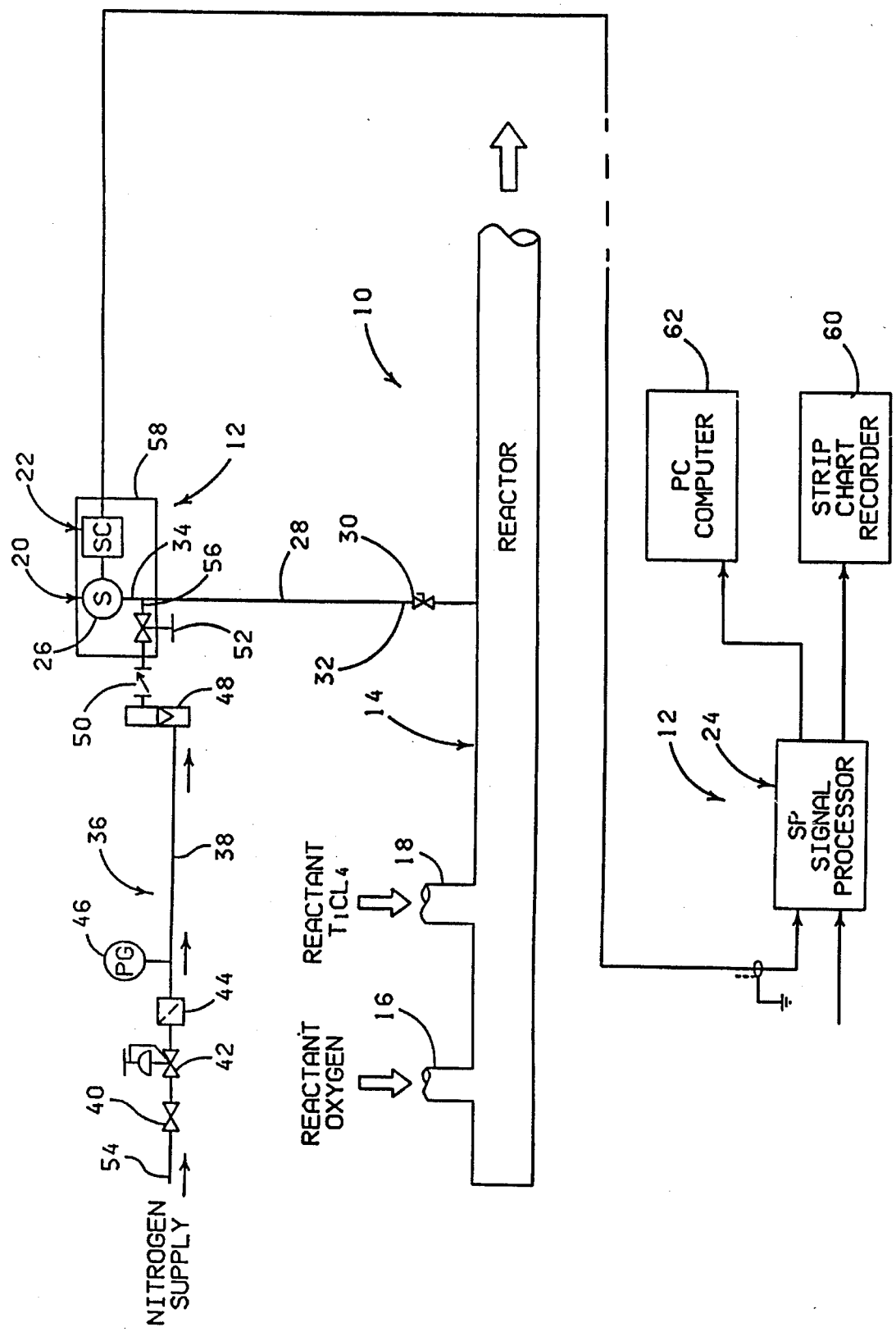

METHOD FOR ENHANCING PRODUCTION OF TITANIUM DIOXIDE

This application is a continuation of application Ser. No. 08/156,005, filed Nov. 23, 1993, now abandoned.

BACKGROUND OF THE INVENTION

1. Field of the Invention

The present invention relates to the production of $TiO_2$, and more particularly, but not by way of limitation, to a method and apparatus for monitoring and controlling pressure fluctuations of fluids in a reactor vessel during formation of $TiO_2$.

2. Brief Description of Prior Art

In the production of titanium dioxide ($TiO_2$), heated titanium tetrachloride ($TiCl_4$) and heated oxygen ($O_2$) are combined in a reactor vessel, commonly referred to as an "oxidizer". A portion of the operating procedure heretofore employed in the production of titanium dioxide has been to adjust the flow rate of reactants until "flutter" sounds are heard by the operator and then to increase the flow rate by a small amount for the production run.

"Flutter" is a descriptive word used in the burner art to denote sounds of uneven combustion. This term was established years ago when burners produced audible chugging sounds. While modern burners are relatively quiet in operation, the term is still used but "flutter" now refers to roughness and/or fizzing sounds produced in a burner assembly. Flutter also is used to refer to the fluttering motion on the pointer of a pressure gauge located at the upstream end of a burner assembly or reactor vessel.

In the production of titanium dioxide, the current process is to tune the reactor in response to sounds that the operator hears as to "flutter". While this procedure is workable, it is not very accurate because flutter detection is a "learned" procedure that requires subjective evaluations of subtle differences between normal and abnormal reactor sounds.

Because of the difficulty in flutter detection in modern reactors, attempts have been made to sense the flutter of the reactor with a microphone, for example, located near the reactor. The signal from the microphone is amplified and conditioned by an audio equalizer and then sent to the control room. Another approach proposed in the prior art is to display the sound spectrum on a computer screen. However, the use of the microphone and the sound spectrum have been only marginally acceptable because the results are generally inconclusive. Thus, a need still exists for a system capable of detecting and monitoring the flutter of modern reactors which is not dependent on the subjective evaluations of the operator between normal and abnormal reactor sounds. It is to such a system that the present invention is directed.

SUMMARY OF THE INVENTION

According to the present invention, an improved system for detecting the flutter of a reactor vessel, such as a reactor tube, is provided where pressure fluctuations of fluids in the reactor vessel are monitored and controlled, thus enhancing the formation of the reaction product. Broadly, the present invention relates to a method and control apparatus for increasing the efficiency of a reaction between fluids in a reactor vessel wherein pressure fluctuations of fluids in the reactor vessel are sensed and output signals are generated proportionate to the sensed pressure fluctuation. The flow rate of the fluids into the reactor vessel is then varied in response to the sensed pressure fluctuations so as to maintain pressure fluctuations of the fluids in the reactor vessel within a predetermined range.

More specifically, the present invention relates to a method for producing $TiO_2$ by reacting $O_2$ and $TiCl_4$ in a reactor tube wherein pressure fluctuations in the flow of fluids through the reactor tube are sensed and output signals are generated proportional to the sensed pressure fluctuations. The flow of $TiCl_4$ and $O_2$ is then varied through the reactor tube in response to predetermined pressure fluctuations so as to increase the efficiency of the reaction between $TiCl_4$ and the $O_2$.

The efficiency of the reaction between $O_2$ and $TiCl_4$ in a reactor assembly is achieved by a control apparatus operably connected to the reactor assembly. The control apparatus, which is capable of monitoring pressure fluctuations in the flow of $TiCl_4$ and $O_2$ through the reactor assembly so that same can be varied in response to predetermined pressure fluctuations, includes a sensor assembly, a signal conditioning unit and a signal processing unit. The sensor assembly provides output signals proportional to sensed pressure fluctuations of fluids in the reactor assembly and the signal conditioning unit amplifies the output signals from the sensor assembly and provides conditioned signals substantially free of extraneous frequency components. The signal processing unit converts the conditioned signals into control signals so that the flow of $TiCl_4$ and $O_2$ into the reactor assembly can be adjusted to provide predetermined pressure fluctuations within the reactor assembly.

An object of the present invention is to provide a control system for reactor assemblies so that the efficiency of reactions carried out therein can be enhanced.

Another object of the present invention, while achieving the before-stated object, is to provide a method and apparatus for sensing and controlling pressure fluctuation in the flow of fluids through a reactor assembly so as to increase the efficiency of the reactor assembly.

Another object of the present invention, while achieving the before-stated objects, is to provide a method and apparatus for enhancing production of $TiO_2$ in a reactor assembly.

Other objects, advantages and features of the present invention will become apparent upon reading of the following detailed description in conjunction with the drawing and the appended claims.

BRIEF DESCRIPTION OF THE DRAWING

The drawing is an elevational view of a reactor assembly for producing $TiO_2$ utilizing a control apparatus constructed in accordance with the present invention.

DETAILED DESCRIPTION

Referring now to the drawing, a reactor assembly 10 having a control apparatus 12 of the present invention is illustrated. The reactor assembly 10 is a conventional reactor assembly and includes an elongated reactor vessel 14 disposed within a combustion chamber (also not shown) of the reactor vessel 14. Oxygen ($O_2$) is introduced into the reactor vessel 14 via conduit 16; and titanium tetrachloride ($TiCl_4$) is introduced into the reactor vessel 14 via conduit 18. Thus, heated titanium tetrachloride ($TiCl_4$) and heated oxygen ($O_2$) are combined within the reactor vessel 14 to produce titanium dioxide ($TiO_2$). It should be noted that in normal operation, reactant flow into the reactor vessel 14 is set at a level to maintain desired temperatures in the reactor vessel, while permitting one to maintain a stable reaction.

Acoustic waves are produced in the reactor vessel 14 due to the reaction occurring between the oxygen ($O_2$) and titanium tetrachloride ($TiCl_4$) in the reactor vessel 14. It has now been discovered that an easily detectable high intensity peak-in the subaudio frequency range is produced in the reactor vessel 14; and this high intensity peak in the subaudio frequency range is related to the intensity of rough sounds of reaction in the reactor vessel 14, i.e., flutter. The subaudible component in the acoustic wave is believed important in that it provides a mechanism to substantially improve reactor operation. That is, the spectrum of acoustic wave intensity within the reactor vessel 14 possesses an unexpectedly low, subaudible frequency component with peak amplitudes that are directly related to audible flutter; whereas other peaks in the spectrum appear unaffected by the operating conditions.

The control apparatus 12 includes a sensor assembly 20, a signal conditioning unit 22 and a signal processing unit 24. The control apparatus 12 is connected to the reactor vessel 14 so that fluid communication is provided between the reactor vessel 14 and a remotely disposed sensor 26 of the sensor assembly 20. Thus, pressure fluctuations of fluids in the reactor vessel 14, i.e., titanium tetrachloride ($TiCl_4$) and oxygen ($O_2$) can be sensed and controlled by operation of the control apparatus 12.

The sensor 26 senses pressure fluctuations in the flow of fluids through the reactor vessel 14 and provides output signals proportional to the sensed pressure fluctuations of fluids in the reactor vessel 14. The output signals from the sensor 26 are amplified and conditioned in the signal conditioning unit 22 so as to provide conditioned signals substantially free of extraneous frequency components. The conditioned signals from the signal conditioning unit 22 function as input signals to the signal processing unit 24. The signal processing unit 24 then converts the conditioned signals into control signals so that the flow of the fluids into the reactor vessel 14 can be adjusted to provide predetermined pressure fluctuations within the reactor vessel 14.

The sensor assembly 20 includes the sensor 26, a stethoscope conduit 28 and a valve 30. The valve 30 is connected to the reactor vessel 14 so that fluid communication is established with the combustion chamber (not shown) of the reaction vessel 14. In addition, when the valve 30 is closed, the stethoscope conduit 28 can be disconnected for maintenances purposes without shutting down the reactor vessel 14.

The stethoscope conduit 28, a long, small diameter tube, is provided with a first end 32 and an opposed second end 34. The first end 32 of the stethoscope conduit 28 is connected to the valve 30 and the opposed second end 34 thereof is connected to the sensor 26. Thus, when the valve 30 is in its open mode, fluid communication is established between the sensor 26 and the combustion chamber of the reactor vessel 14 via the stethoscope conduit 28. It is important that the stethoscope conduit 28 be free of kinks and/or joints so as to prevent the development of echoes. It should also be noted that, in addition to serving as a conduit for providing fluid communication between the remotely disposed sensor 26 and the reactor vessel 14, the stethoscope conduit 28 functions to protect fragile electronic components by placing them in a safe, well protected location away from the reactor vessel 14.

In the practice of the present invention, any suitable commercially available sensor capable of sensing pressure fluctuations in the reactor vessel 14 and which is capable of providing output signals indicative of such pressure fluctuations can be employed as the sensor 26 of the control system 12. For example, a commercially available sensor which can be employed is a piezoelectric-type pressure sensor capable of generating an electrostatic charge output when stressed by a dynamic pressure input.

To prevent process materials from contacting the sensor 26, while at the same time maintaining the stethoscope conduit 28 substantially clean and free of extraneous materials, a purge assembly 36 is connected to the stethoscope conduit 28 so that fluid communication is established therebetween. The purge assembly 36 comprises a purge conduit 38, a shut-off valve 40, a pressure regulator 42, a line filter 44, a pressure gauge 46, a rotameter or flow meter 48, a check valve 50 and a needle valve 52. The purge conduit 38 is provided with a first end 54 connected to an inert gas source (not shown) and an opposed second end 56 connected to the stethoscope conduit 28.

The pressure regulator 42, which permits one to maintain the inert gas at a predetermined pressure so as to provide sonic conditions in the needle valve 52, is disposed within the purge conduit 38 near the first end 54 and downstream of the shut-off valve 40. The filter 44, which is adapted to remove particulate matter from the inert gas so as to prevent blockage of the needle valve 52, is disposed within the purge conduit 38 downstream of the pressure regulator 42. The pressure gauge 46 which provides a guide for the operator in the adjustment or setting of the pressure regulator 42 so that sonic flow of the inert gas is provided through needle valve 52, and the rotameter 48 are disposed within the purge conduit 38 downstream of the filter 44 substantially as shown; and the check valve 50, a safety device that prevents the release of toxic reactor gases in the event the glass sight tube of the rotameter 48 should break, is disposed downstream of the rotameter 48. The needle valve 52, is disposed within the purge conduit 38 so that the needle valve 52 is located immediately upstream of the stethoscope conduit 28. The needle valve 52, which adjusts the inert purge gas to a rate of flow depending on the rotameter pressure, provides sonic flow of the inert gas so that the flow of the inert gas through the stethoscope conduit 28 is independent of pressure in the reactor vessel 14.

The needle valve 52, the sensor 26 and the signal conditioning unit 22 are positioned within a vented housing 58 remotely disposed relative to the reactor vessel 14. This arrangement places such components in a safe area away from the activities of reactor maintenances. The housing 58 is vented to prevent pressurization of the housing 58 in the event a leak develops in the housing 58. Further, conduits for electrical cables of the control apparatus are sealed to prevent possible flow of toxic gases through such conduits.

In operation of the control apparatus 12, pressure fluctuations in the flow of fluids through the reactor vessel 14 are measured by the sensor 26 which provides output signals proportional to the sensed pressure fluctuations in the flow of the fluids in the reactor vessel 14. The output signals from the sensor 26 serve as input signals for the signal conditioning unit 22. The signal conditioning unit 22, which may be easily assembled from commercially available components, removes frequency components not related to the "flutter" of the reactor vessel 14 and amplifies selected signals from the sensor 26 to provide conditioned signals substantially free of extraneous frequency components.

The conditioned signals from the signal conditioning unit 22 serve as input signals for the signal processing unit 24.

The signal processing unit 24 converts the conditioned signals from the signal conditioning unit 22 into control signals which can be recorded on a strip chart recorder 60 and/or employed as input signals to a computer 62. That is, the conditioned signals can be recorded by the strip chart recorder 60 to enable the operator to manually adjust the flow of fluids into the reactor vessel 14 to enhance the efficient operation of the reactor vessel 14 by controlling fluctuations of fluids therein, or such signals can be inputted to the computer 62 wherein such signals are then converted to signals so that the flow of fluids into the reactor vessel 14 can be automatically adjusted and controlled in response to predetermined pressure fluctuations.

The input signals for the signal processing unit 24 have irregular waveforms resulting from rapid variations in amplitude and frequency. These signals are altered into a more usable form by the signal processing unit 24 which has an analog circuit, containing an amplitude detector that follows the intensity of the acoustic waves. The circuit also uses a slow filter that holds the highest detected values for prolonged time periods.

The form or type of signal processing unit 24 is not unique to the present invention. For example, instead of using the amplitude of the acoustics waves, the power of the acoustic waves can be computed and used as an output signal for controlling the reactor vessel 14.

The signal processing unit 24 is not limited to electronic analog circuitry. Digital circuits can be employed in this application by first changing the input signals to digital values and then employing computer software to determine the intensity of the acoustic waves. The output produced by the software can be converted, if necessary, to analog signals.

During operation of the reactor vessel 14, a constant flow of inert gas, such as nitrogen, is maintained through the stethoscope conduit 28. The constant flow of the inert gas through the stethoscope conduit 28 prevents processed materials from contacting the sensor 26, while at the same time maintaining the stethoscope conduit 28 substantially clean and free of extraneous matter.

The needle valve 52 of the purge assembly 36, which is located immediately upstream of the sensor 26, is operated with choked flow conditions, i.e. sonic flow conditions. Thus, the combination of the purge conduit 38, the needle valve 52, and the location of the needle valve 52 relative to the sensor 26 provides a convenient method for increasing the amplitude of the pressure wave at the sensor 26. The needle valve 52 also provides a way for adjusting the flow rate of the purge gas to insure that such flow prevents processed materials from contacting the sensor 26.

While the present invention has been described for the production of titanium dioxide, it is to be understood that the method and control apparatus 12 hereinbefore described can be employed to increase the efficiency of any reaction wherein pressure fluctuations are produced by the reaction of fluids in a reactor vessel. The term "fluid" as used herein is to be understood to include liquids, gases and combinations thereof.

Changes may be made in the various components, elements and assemblies described herein and changes may be made in the steps or sequence of steps of the methods described herein without departing from the spirit and scope of the invention as defined in the following claims.

What is claimed is:

1. A method for producing $TiO_2$ by reacting $O_2$ and $TiCl_4$ in a tube, which includes providing a flow of $TiCl_4$ to the tube and providing a flow of $O_2$ to the tube; the improvement comprising:

sensing fluid pressure fluctuations in the tube to detect amplitudes of subaudible acoustic waves and outputting signals proportional to the sensed fluctuations;

amplifying the output signals and providing signals substantially free of frequency components not related to subaudible acoustic waves resulting from uneven combustion within said tube;

controlling the flow of at least one of the $TiCl_4$ or $O_2$ through the tube in response to amplitudes of subaudible acoustic waves exceeding a set value, thereby increasing the efficiency of the reaction between the $TiCl_4$ and the $O_2$ when compared to a reaction of $TiCl_4$ and $O_2$ without such responsive flow control;

reacting the $TiCl_4$ and $O_2$, the flow of at least one of which has been controlled; and recovering the $TiO_2$ formed by the reaction.

2. The method of claim 1 wherein a pressure sensor for sensing the pressure fluctuations in the reactor tube is remotely disposed relative to the reactor tube and wherein the pressure sensor and reactor tube are operably connected via a stethoscope conduit and wherein the method further comprises purging the stethoscope conduit with an inert gas.

3. The method of claim 2 further comprising adjusting the pressure of the inert gas to provide sonic flow of the inert gas prior to introduction into the stethoscope conduit.

4. The method of claim 1 further comprising conditioning the sensed pressure fluctuation signals so as to amplify such signals and remove high frequency signals therefrom.

5. The method of claim 4 further comprising recording the conditioned signals to provide a recorded visual display of such conditioned signals.

6. The method of claim 5 wherein a pressure sensor for sensing the pressure fluctuations in the reactor tube is remotely disposed relative to the reactor tube, the pressure sensor and reactor tube are operably connected via a stethoscope conduit and wherein the method further comprises purging the stethoscope conduit with an inert gas.

7. The method of claim 6 wherein a needle valve is disposed upstream of the stethoscope conduit and wherein the method further comprises adjusting the pressure of the inert gas to provide sonic flow in the needle valve so that the flow of inert gas through the stethoscope conduit is independent of downstream pressure.

8. The method of claim 7 wherein the step of varying the flow of at least one of the $TiCl_4$ or $O_2$ through the reactor tube is carried out in response to the recorded visual display of the conditioned signals.

9. The method of claim 4 wherein varying the flow of at least one of the $TiCl_4$ or $O_2$ through the reactor tube is carried out in response to the conditioned sensed pressure fluctuation signals.

10. The method of claim 4 wherein the pressure sensor is capable of generating an electronic signal proportional to a dynamic pressure input.

11. The method of claim 10 further comprising adjusting the pressure of the inert gas to provide sonic flow in the needle valve so that the flow of the inert gas prior to introduction into the stethoscope conduit is independent of downstream pressure.

12. The method of claim 10 wherein the pressure sensor is a piezoelectric pressure sensor.

13. A method for enhancing the production of $TiO_2$ by increasing the efficiency of a reaction between $O_2$ and $TiCl_4$ in a reactor vessel, which includes providing a flow of $TiCl_4$ to the reactor vessel and providing a flow of $O_2$ to the reactor vessel, the improvement comprising:

sensing fluid pressure fluctuations in the reactor vessel to detect amplitudes of subaudible acoustic waves and outputting signals proportional to the sensed fluctuations;

amplifying the output signals and providing signals substantially free of frequency components not related to subaudible acoustic waves resulting from uneven combustion within said vessel;

controlling the flow rate of at least one of the $TiCl_4$ or $O_2$ into the reactor vessel in response to the sensed amplitudes of subaudible acoustic waves so as to maintain the amplitudes of subaudible acoustic waves within the reactor vessel within a set value;

reacting the $TiCl_4$ and $O_2$ the flow of at least one of which has been controlled; and recovering the $TiO_2$ formed by the reaction.

14. The method of claim 13 wherein a pressure sensor for sensing the pressure fluctuations in the reactor vessel is remotely disposed relative to the reactor vessel and wherein the pressure sensor and reactor vessel are operably connected via a stethoscope conduit and wherein the method further comprises purging the stethoscope conduit with an inert gas.

15. The method of claim 14 further comprising adjusting the pressure of the inert gas so as to provide sonic flow of the inert gas prior to introducing the inert gas into the stethoscope conduit.

16. The method of claim 15 further comprising conditioning the pressure fluctuation signals so as to amplify such signals and remove high frequency signals therefrom.

17. The method of claim 16 further comprising passing the conditioned signals to a recorder to record such conditioned signals and employing the recorded conditioned signals as a basis for adjusting the flow rate of at least one of the $TiCl_4$ or $O_2$ into the reactor vessel.

18. The method of claim 17 further comprising passing the conditioned signals to a control system so as to produce output control signals, and varying the flow of at least one of the $TiCl_4$ or $O_2$ in the reactor vessel in response to the output control signals.

19. The method of claim 13 further comprising:

conditioning the pressure fluctuation signals to amplify such signals and to remove high frequency components therefrom; and passing the conditioned signals to a recorder for recording such conditioned signals, the recorded conditioned signals providing data for adjusting the flow rate of at least one of the $TiCl_4$ or $O_2$ in the reactor vessel in response to the conditioned signals.

20. The method of claim 19 wherein a pressure sensor capable of generating an electronic signal proportional to the dynamic pressure input is remotely disposed relative to the reactor vessel and wherein the pressure sensor is connected to the reactor vessel via a stethoscope conduit so that fluid communication is provided between the reactor vessel and the pressure sensor, and wherein the method further comprises purging the stethoscope conduit with an inert gas.

21. The method of claim 20 further comprising regulating the pressure of the inert gas so as to provide sonic flow of the inert gas prior to introduction into the stethoscope conduit and thereby render the flow of the inert gas through the stethoscope conduit independent of downstream pressure.

22. The method of claim 20 wherein the pressure sensor is a piezoelectric pressure sensor.

* * * * *